United States Patent [19]

Walenty et al.

[11] Patent Number: 5,390,992
[45] Date of Patent: Feb. 21, 1995

[54] VEHICLE ELECTRIC BRAKE SYSTEM WITH STATIC BRAKE TORQUE CONTROL

[75] Inventors: Allen J. Walenty, Macob; Kevin G. Leppek, Rochester Hills, both of Mich.

[73] Assignee: General Motors Corporation, Detroit, Mich.

[21] Appl. No.: 26,040

[22] Filed: Mar. 4, 1993

[51] Int. Cl.$^6$ ............................................. B60T 13/74
[52] U.S. Cl. ..................................... 303/112; 318/376
[58] Field of Search ................ 303/112, 20, 3, 5, 109; 192/4 A, 3.56, 9, 13 R, 12 D, 13 A, 1.27, 1.28, 1.32, 1.37, 1.38; 180/65.1, 165; 318/52; 477/190, 191, 196, 199, 193

[56] References Cited

U.S. PATENT DOCUMENTS

| | | | |
|---|---|---|---|
| 3,728,599 | 4/1973 | Minami | 318/376 |
| 4,375,603 | 3/1983 | Konrad | 318/376 |
| 4,561,527 | 12/1985 | Nakamoto et al. | 192/4 C |
| 4,629,043 | 12/1986 | Matsuo et al. | 192/4 A |
| 4,799,161 | 1/1989 | Hirotsu et al. | 318/52 |
| 4,804,893 | 2/1989 | Melock | 318/269 |
| 4,962,969 | 10/1990 | Davis | 303/112 |
| 5,253,929 | 10/1993 | Ohori | 303/112 |

*Primary Examiner*—Matthew C. Graham
*Attorney, Agent, or Firm*—Howard N. Conkey

[57] ABSTRACT

An electric braking system controls the vehicle brake torque based on the pressure applied by the vehicle operator to the vehicle brake pedal and a moving vehicle brake system gain to provide normal power assisted braking while the vehicle is moving. The deviation of the vehicle braking condition from a level incline and lowest vehicle weight (LVW) is determined based upon a determined percent difference between the actual vehicle deceleration while the vehicle is being braked to a stop and an expected deceleration that would result from the total brake torque, a level road surface, and the vehicle weight at LVW. The expected deceleration is determined by determining the total vehicle brake torque represented by the sum of the brake torques applied by the individual wheel brakes and dividing by the LVW of the vehicle. The target torque required to hold the vehicle when stationary is then determined by adjusting a minimum torque value, corresponding to a level road surface and the vehicle weight at LVW, based upon the percent difference in the deceleration values. Finally, a static gain of the electric braking system is determined by dividing the required torque by the operator applied pedal pressure. When the vehicle comes to a rest, the brake system gain is adjusted to the static gain to establish the brake torque at the lowest level required to hold the vehicle stationary on the road surface to thereby minimize static braking actuator current.

6 Claims, 2 Drawing Sheets

VEHICLE ELECTRIC BRAKE SYSTEM WITH STATIC BRAKE TORQUE CONTROL

BACKGROUND OF THE INVENTION

This invention relates to a vehicle electric brake system having stationary vehicle holding brake torque control.

Vehicles which rely on electrical power to generate a braking force are required to continuously apply a holding torque when the vehicle is stationary. Without an estimate of the condition of the vehicle, a braking force equal to the maximum rated vehicle weight (GVW) times the sine of a maximum incline must be maintained in order to assure the vehicle is maintained stationary for any load and incline condition. This results in applying a greater braking torque than is necessary under most conditions.

Since braking torque in electric braking systems is proportional to current in the braking actuators (such as electric motor actuators), unnecessary current will be applied to the actuators under most conditions when the vehicle is stopped. This places an unnecessary strain on the vehicle's electrical system and generates excessive heat in the actuators and the electronic brake controller.

SUMMARY OF THE INVENTION

In general, this invention provides a method and system for applying the minimum current to the actuators of a vehicle electric brake system required to prevent a stopped vehicle from creeping on various road surface inclines and with varying vehicle loading. This is accomplished in the preferred form of the invention by adaptively adjusting the static (stopped vehicle) gain of the electric brake system as a function of the incline/-loading of the vehicle and the pressure applied by the vehicle operator to the brake pedal. The static gain is increased from a low gain value corresponding to a level incline and lowest vehicle weight (LVW) for increasing incline angles and increasing vehicle loading and is decreased for increasing operator applied brake pedal pressure so that the amount of brake actuator current is adaptively adjusted according to the actual brake torque required to maintain the vehicle stationary on the road surface.

According to a specific aspect of the invention, while the vehicle is moving, the vehicle brake torque is based on the pressure applied by the vehicle operator to the vehicle brake pedal and a moving vehicle brake system gain to provide normal power assisted braking. The deviation of the vehicle braking condition from a level incline and LVW is determined based upon a determined percent difference between the actual vehicle deceleration while the vehicle is being braked to a stop and an expected deceleration that would result from the total brake torque, a level road surface, and the vehicle weight at LVW. The expected deceleration is determined by determining the total vehicle brake torque represented by the sum of the brake torques applied by the individual wheel brakes and dividing by the LVW of the vehicle. The target torque required to hold the vehicle when stationary is then determined by adjusting a minimum torque value, corresponding to a level road surface and the vehicle weight at LVW, based upon the percent difference in the deceleration values. Finally, the static gain of the electric braking system is determined by dividing the required torque by the operator applied pedal pressure. When the vehicle comes to a rest, the brake system gain is adjusted to the static gain resulting in the brake torque being established at the minimum level required to hold the vehicle stationary on the road surface to thereby minimize static braking actuator current.

DESCRIPTION OF THE DRAWINGS

The invention may be best understood by reference to the following description of a preferred embodiment and the drawings in which.

DESCRIPTION OF A PREFERRED EMBODIMENT

Figure 1:
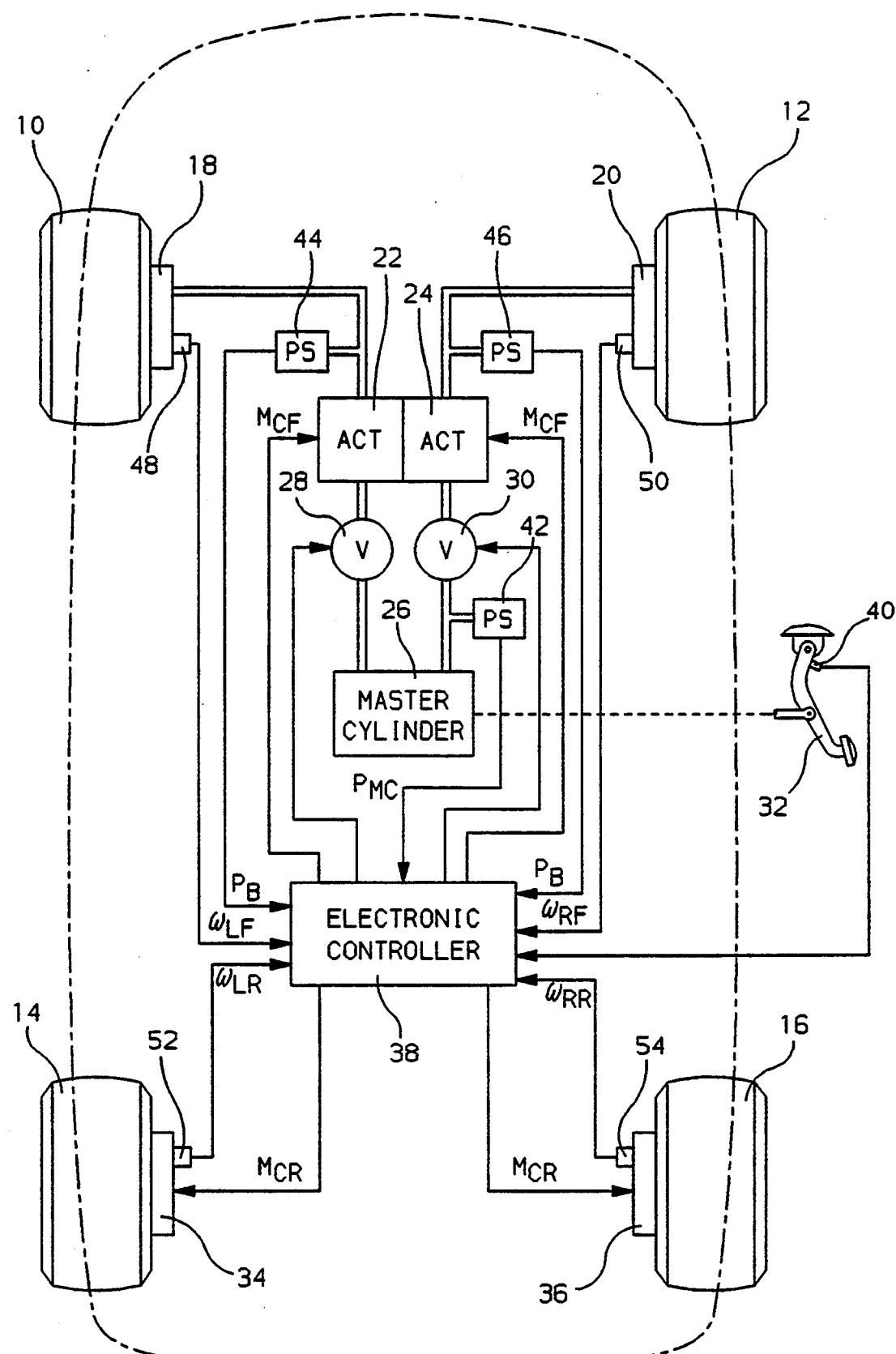
FIG. 1 is a diagram of a wheel braking system for a vehicle which includes an electronic controller for controlling the vehicle front and rear brakes in accord with the principles of this invention.

A vehicle braking system is illustrated in FIG. 1. In general, the vehicle includes left and right front driven wheels (10) and (12) and left and right rear nondriven wheels (14) and (16). The front wheels (10) and (12) have respective hydraulic actuated brakes (18) and (20) actuated by hydraulic pressure generated via respective electrohydraulic actuators (22) and (24). Each of the hydraulic brakes (18) and (20) are further hydraulically coupled to a conventional master cylinder (26) through respective normally open electromagnetic valves (28) and (30). The actuators (22) and (24) include a working chamber hydraulically coupled to the wheel brakes (18) and (20) and the valves (28) and (30). In the preferred form of the invention, the electrohydraulic actuators (22) and (24) each takes the form of a DC torque motor driven actuator wherein a motor is operated to control a piston for regulating the braking pressure. The brake torque is established at each brake (18) and (20) at a value proportional to the torque output of the respective torque motor. For example, the electrohydraulic brake actuators (22) and (24) may each take the form of the electrohydraulic actuator as described in the U.S. Pat. No. RE. 33,557 which issued Mar. 19, 1991 and which is assigned to the assignee of this invention. The master cylinder (26) is operated by a conventional vehicle brake pedal (32) in response to the foot pressure applied by the vehicle operator.

The rear wheels (14) and (16) are braked by means of a pair of electrically operated brakes (34) and (36). The brakes (34) and (36) may each take the form of an electronically operated drum brake in which the braking torque is established by operation of a DC torque motor and at a value proportional to the torque output of the DC torque motor. One example of such a brake is illustrated in the U.S. Pat. No. 5,000,291 issued Mar. 19, 1991 which is assigned to the assignee of this invention.

The front and rear brakes (18), (20), (34) and (36) are operated to establish a desired braking condition by means of an electronic controller (38). In general, the electronic controller (38) senses a braking command input by the vehicle operator by sensing the state of a conventional brake switch (40) which provides a signal when the vehicle operator applies pressure to the brake pressure (32). When the brake switch input is sensed, the electronic controller (38) operates the electromagnetic valves (28) and (30) to close off the hydraulic communication between the master cylinder and the electrohydraulic actuators (22) and (24). This effectively isolates the front wheel brakes (18) and (20) from the master cylinder (26) such that the hydraulic pressure at the wheel brakes are controlled solely by means of the electrohydraulic actuators (22) and (24). The degree of braking effort commanded by the vehicle operator is sensed by means of a pressure sensor (42) monitoring the hydraulic pressure output of the master cylinder (26). As is well known, the hydraulic pressure output of the master cylinder (26) is directly proportional to the applied pressure to the brake pedal (32) controlling the position of the master cylinder (26).

The pressure output of the pressure sensor (42) is a value $P_{MC}$ representing the operator commanded braking effort. Other means may be provided for indicating this operator braking request, such as a force sensor directly mounted to the brake pedal (32) or a position sensor monitoring movement of the brake pedal (32). In response to the brake effort command $P_{MC}$, the electronic controller (38) then provides for establishing a desired brake torque at each of the front wheels (10) and (12) via the respective brakes (18) and (20) by commanding a motor current $M_{CF}$ to each of the actuators (22) and (24) to establish the braking pressure at a desired level $P_{BC}$ related to the brake effort command $P_{MC}$. The actual hydraulic pressure $P_B$ applied to the brakes (18) and (20) are sensed by a pair of pressure sensors (44) and (46), respectively and used by the controller for closed loop brake pressure control.

Similarly, the electronic controller (38) establishes the current to the electric brakes (34) and (36) at a commanded value $M_{CR}$ to establish a desired braking condition of the rear wheels (14) and (16). For example, the braking torque established by the motor current command $M_{CR}$ may be established in accord with a schedule to establish a desired front to rear brake torque proportioning value.

It is apparent that when the vehicle is stationary, it is desirable to maintain the motor currents $M_{CF}$ to each of the electrohydraulic actuators (22) and (24) and the motor currents $M_{CR}$ to the rear drum brakes (34) and (36) at a minimum value as required to maintain the vehicle stationary. It is further apparent that this minimum current required to hold the vehicle stationary is a function of the incline of the roadway on which the vehicle is stopped, the weight of the vehicle, engine idle speed, brake condition, etc. In accord with this invention, the motor current for a static condition of the vehicle is adaptly controlled so as to establish the brake torque at each of the wheels (10)–(16) at the lowest level required for holding the vehicle stationary on the road surface to thereby minimize the static braking actuator current values.

In accord with this invention, the road incline and vehicle conditions which dictate the brake torque required to maintain the vehicle stationary are based upon the wheel speeds sensed while the vehicle is being braked to a standstill. In this regard, the speeds of the wheels (10)–(16) are monitored by respective wheel speed sensors (48)–(54) providing respective wheel speed signals $\omega_{LF}$, $\omega_{RF}$, $\omega_{LR}$ and $\omega_{RR}$ to the electronic controller (38). The wheel speed assemblies may take any form such as the speed sensors typically used in vehicle antilock brake control systems for monitoring wheel speeds. For example, these systems may be comprised of an exciter ring rotated with the wheel and an electromagnetic sensor which monitors the rotation of the exciter ring to provide a signal having a frequency proportional to wheel speed. The electronic controller (38) then measures the frequency of these signals to establish the respective wheel speed values.

Figure 2:
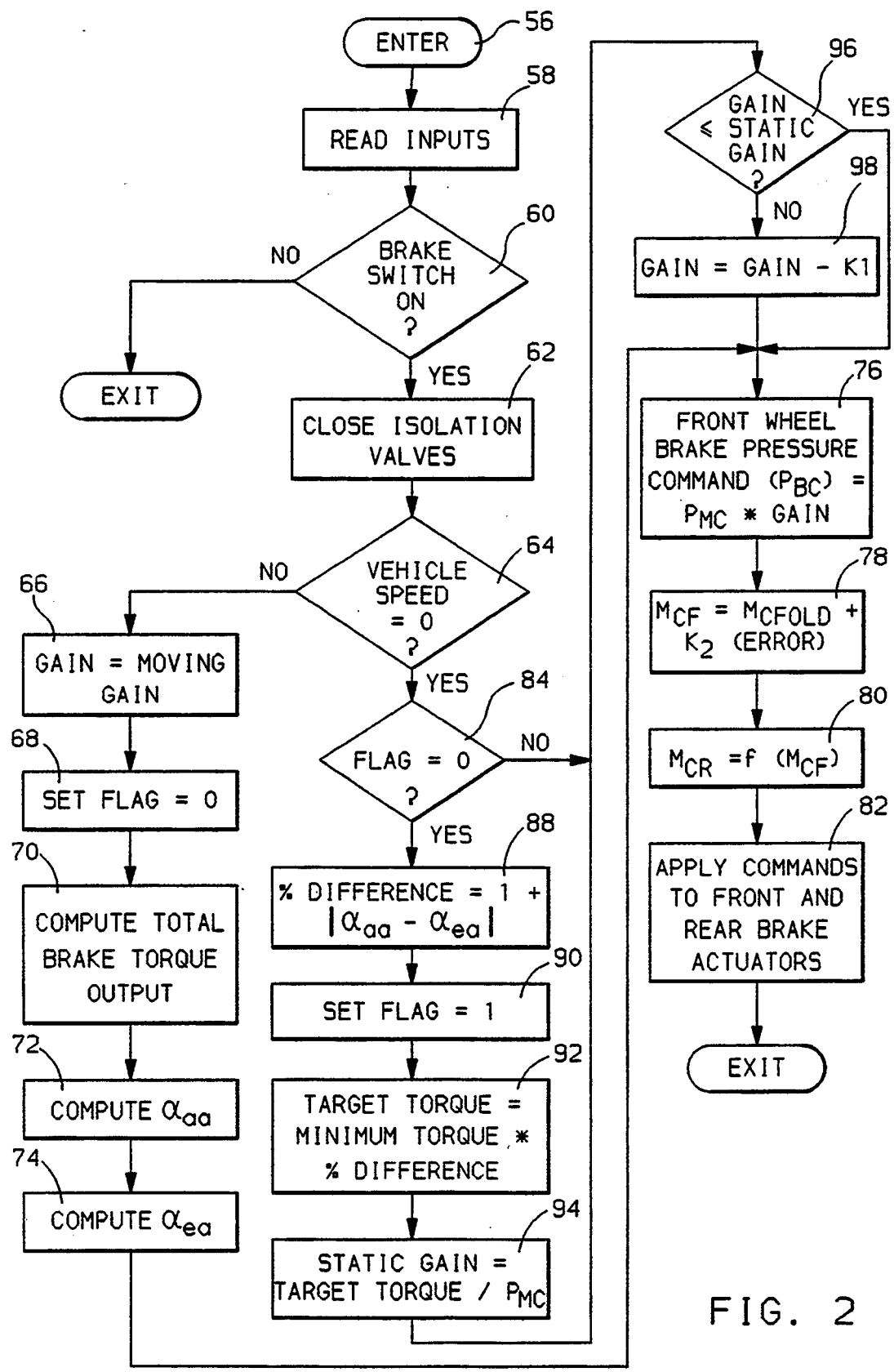
FIG. 2 is a flow diagram illustrating the operation of the electronic controller of FIG. 1.

The control of the vehicle braking torque by the electronic controller (38) is illustrated by the flow diagram of FIG. 2. In this regard, the electronic controller (38) includes a standard digital computer, such as a Motorola MC68HC11 microcomputer, along with standard interface and driver circuits for interfacing the input and output signals. For example, the wheel speed signals may be provided to a conventional interface and squaring circuit to condition the speed signals provided to the input of the microcomputer. Additionally, the output motor commands of the microcomputer may be provided to motor driver interface circuits and H-switch drivers to provide signals for controlling the motors associated with the electrohydraulic actuators (22) and (24) and the electric rear brakes (34) and (36). The driver interface and H-switch driver for controlling the motors may take the form of the driver illustrated in the U.S. Pat. No. 4,835,695, issued May 30, 1989.

The microcomputer contained within the electronic controller (38) includes a memory storing the instructions necessary to implement the algorithm as diagrammed in FIG. 2. The routine of FIG. 2 is executed in response to each of repeated interrupts which are generated by the microcomputer at predetermined fixed time intervals. Upon the occurrence of an interrupt, the microcomputer begins executing the functions as depicted in FIG. 2.

In response to an interrupt, the routine is entered at point (56) and proceeds to a step (58) where the various inputs to the controller (38) are read and stored in memory. These inputs include the various pressure signals provided by the pressure sensors (42), (44) and (46) and the wheel speeds as represented by the speed signal outputs of the speed sensors (48)–(54). Additionally, the state of the brake switch (40) is sampled and stored.

Step (60) next determines whether or not the operator has applied pressure to the brake pedal (32) for braking the vehicle as represented by the state of the brake switch sampled at step (58). If the operator is not applying pressure to the pedal (32), the program exits the routine. However, if step (60) determines the state of the brake switch indicates the operator is applying pressure to the brake pedal, the isolation valves (28) and (30) are energized at step (62) to decouple the brakes (18) and (20) and the actuators (22) and (24) from the master cylinder (26). When these valves are energized to close off the hydraulic communication between the master cylinder (26) and the electromagnetic actuators (22) and (24), the front wheel brake circuits are conditioned for controlling the brake pressure and thereby the brake torque by control of motor current to the torque motors in the electromechanical brake actuators (22) and (24).

Step (64) then determines whether or not the vehicle is at rest. This is determined by comparing vehicle speed as represented, for example, by an average of the four vehicle wheel speeds with a speed reference such as zero or some low vehicle speed value. If the vehicle is not at rest, the routine proceeds to a step (66) where a brake system gain is set equal to a moving gain value which is a calibration value providing for normal power assisted braking. To enable the routine to sense when the vehicle first comes to a stop, a flag is reset at step (68).

In order to determine the brake torque required to hold the vehicle stationary when brought to a stop, the deviation of the vehicle braking condition from a level incline and LVW is determined based upon a percent difference between the actual vehicle deceleration while the vehicle is being braked to a stop and an expected deceleration that would result from the total braking torque of the four wheels (10)-(16) on a level road surface with the vehicle weight at LVW. To enable this computation, step (70) computes the total brake torque of the vehicle wheels. For each of the front wheels (10) and (12), the individual wheel brake torques are computed based upon the hydraulic pressure $P_B$ for each front wheel brake (18) and (20) measured by the respective pressure sensors (44) and (46) and a predetermined brake system gain. For the rear electric drum brakes (34) and (36), the wheel brake torques are computed as a function of the motor current $M_{CR}$ and a predetermined brake system gain. Once computed, the individual brake torques are summed to provide the total wheel brake torque output of the vehicle brake system.

Step (72) next determines the actual vehicle deceleration $\alpha_{aa}$ based upon the change in vehicle speed over a predetermined time period. This vehicle deceleration may be based upon an average value of vehicle deceleration spanning 3 interrupt intervals associated with the routine of FIG. 2. Similarly, an expected vehicle deceleration $\alpha_{ea}$ is computed by dividing the total torque value computed at step (70) by the LVW static weight of the vehicle. This expected vehicle deceleration computed at step (74) is a baseline value that corresponds to the vehicle deceleration that would result from the total brake torque computed at step (70) assuming the vehicle is on a level surface and has a static weight equal to LVW.

Step (76)-(82) provide for control of the motor currents to establish the desired braking condition of the vehicle. Specifically, beginning at step (76), the front wheel brake pressure command $P_{BC}$ is computed by multiplying the operator brake effort command represented by the pressure $P_{MC}$ measured by the pressure sensor (42) by the brake system gain. This gain will be either the moving gain value to provide for normal power assisted braking or a static gain. Since the brake system gain was last established at step (66) to the moving gain, the front Wheel brake pressure command $P_{BC}$ is established to provide for normal power assisted braking.

Step (78) then provides for individual closed loop management of the brake pressure output of the electrohydraulic actuators (22) and (24) to establish the respective front wheel brake pressures $P_B$ equal to the commanded pressure value $P_{BC}$. In this regard, step (78) is executed for each front wheel brake and provides for establishing the motor command current $M_{CF}$ at a value defined by the expression $$M_{CF} = M_{CFOLD} + K_2(\text{ERROR}),$$

where $M_{CFOLD}$ the last determined value of $M_{CF}$, $K_2$ is a calibration constant less than unity and ERROR is the difference between the measured pressure $P_B$ and the desired commanded pressure $P_{BC}$ determined at step (76).

Step (80) then determines the motor current command $M_{CR}$ for each of the rear wheel brakes (34) and (36). In this embodiment, $M_{CR}$ is a predetermined function of the motor current $M_{CF}$ applied to the torque motors of the actuators (22) and (24) for the front wheel brakes (18) and (20). The function is a predetermined function establishing a desired distribution of the brake force between the front and rear wheel of the vehicle.

The front and rear wheel current commands established via steps (78) and (80) are then applied at step (82) to the respective torque motors in the actuators (22) and (24) and the wheel brakes (34) and (36) to establish the desired braking condition of the vehicle. Thereafter, the program exits the brake control routine.

The foregoing steps are continuously repeated as long as the vehicle is moving to provide for power assisted braking according to the pressure applied to the brake pedal (32) by the vehicle operator. However, when the vehicle is brought to a stop, the brake torque applied to each of the wheel brakes (18), (20), (34) and (36) are reestablished at the minimum level required to maintain the vehicle stationary on the road surface to thereby minimize the current to the torque motors of the wheel brakes. This function is initiated when step (64) senses a static vehicle condition. When this condition is sensed, a step (84) samples the state of the flag that was previously reset at step (68). A reset condition of the flag sensed at step (84) indicates the routine of FIG. 4 is being executed for the first time since a static condition of the vehicle was first sensed. Assuming the flag is reset, a series of steps (88)-(94) determines a static gain for the brake system that is based on the absolute percentage of difference between the expected vehicle deceleration $\alpha_{ea}$ computed at step (74) and the actual vehicle deceleration $\alpha_{aa}$ computed at step (72). First, step (88) determines the absolute percent difference between the actual vehicle deceleration $\alpha_{aa}$ last computed at step (72) and the expected vehicle deceleration $\alpha_{ea}$ last computed at step (74). This percent difference is a value equal to or greater than unity with the amount greater than unity representing the deviation of the braking condition from a condition represented by a level road surface and a vehicle weight at LVW. The absolute value of the percent difference is computed at step (88) in accord with the expression $$1 + ||\alpha_{aa} - \alpha_{ea}||.$$

By using the absolute value of the difference, a single computation applies for both uphill and downhill vehicle travel. The flag is then set at step (90) so that steps (88)-(94) are bypassed during subsequent executions of the brake control routine.

A target torque value representing the minimum torque required to hold the vehicle stationary is then computed by multiplying a minimum torque value times the percent difference computed at step (88). The minimum torque value is a predetermined minimum for a stationary vehicle on a level road surface with the vehicle weight at LVW. Accordingly, the target torque value computed at step (92) is a value increased from the minimum torque value in accord with the percent difference computed at step (88) which in turn is a value increasing from unity in accord with increasing values of vehicle weight from LVW and increasing grades of the road surface from a level grade. Step (94) then computes a static brake gain value that relates the operator brake effort command value $P_{MC}$ to the desired target torque value. This static gain value is achieved by dividing the target torque value computed at step (92) by the brake effort command $P_{MC}$.

In the preferred embodiment the vehicle brake gain is adjusted from the moving gain value of step (66), used while the vehicle is being brought to a static condition, to the static gain value computed at step (94) at a predetermined rate. This is accomplished beginning at step (96) where the current brake gain value is compared to the static gain value computed at step (94). If the gain has not yet been reduced to the static gain value, the brake gain is reduced at step (98) by a calibration value $K_1$ establishing the rate of change in the gain value. Thereafter, steps (76)–(82) are executed as previously described to establish the motor current command values $M_{CF}$ and $M_{CR}$ as previously described based upon the last established brake gain value. As can be seen, as the brake gain is reduced from the moving gain value, the motor current values are reduced via operation of the steps (76)–(82). When, through repeated executions of the routine of FIG. 2, the brake gain is reduced to the static gain value via operation of steps (96) and (98), step (98) is thereafter bypassed. At this time, the brake torque established through operation of steps (76)–(82) is at the target torque value and is the minimum value adaptively determined to maintain the vehicle stationary. Since the static gain value is computed via step (94) only once at the instant the vehicle become stationary, the operator may further increase the braking pressure if desired by thereafter further increasing the pressure applied to the brake pedal (32) which results in the front wheel brake pressure command computed at step (76) and the corresponding rear brake motor current command increasing in accord with the increase of the commanded brake effort $P_{MC}$.

In accord with the foregoing, the static braking torque of the vehicle is made adaptive to the vehicle braking conditions including the roadway grade, vehicle weight, the condition of the brake system, and idle speed of the vehicle engine. By making the static brake torque adaptive to these parameters, the brake torque is established at the minimum level required to maintain the vehicle stationary thereby minimizing the motor current required for the electric brake actuators.

While a specific preferred embodiment has been described, it is understood that many modifications may be made by the exercise of skill in the art without departing from the scope of the invention.

We claim:

1. A method of braking a vehicle having a brake system for applying a brake torque for braking the vehicle, the method comprising the steps of:
    sensing a braking command;
    while the vehicle is moving (A) controlling the brake system for applying the brake torque for braking the vehicle at a level in accord with predetermined parameters including the braking command, (B) determining an actual vehicle deceleration, and (C) determining an expected vehicle deceleration resulting from the applied brake torque and a predetermined vehicle braking condition;
    determining a stopped vehicle target brake torque value as a predetermined function of a difference between the determined actual vehicle deceleration and the determined expected vehicle deceleration; and
    while the vehicle is stopped, controlling the brake system to apply the brake torque at the stopped vehicle target brake torque value.

2. The method of claim 1 wherein the predetermined vehicle braking condition comprises a level incline of the vehicle and a lowest vehicle weight so that the difference between the determined actual vehicle deceleration and the determined expected vehicle deceleration represents a deviation of an actual vehicle braking condition from the predetermined vehicle braking condition.

3. A method of braking a vehicle having a brake system for applying a brake torque for braking the vehicle, the method comprising the steps of:
    sensing a braking command;
    while the vehicle is moving (A) controlling the brake system for applying the brake torque for braking the vehicle at a level in accord with predetermined parameters including the braking command, (B) determining an actual vehicle deceleration, and (C) determining an expected vehicle deceleration resulting from the applied brake torque and a predetermined vehicle braking condition;
    sensing a stopped condition of the vehicle;
    when a stopped condition is first sensed (A) determining a percent difference between the determined actual vehicle deceleration and the determined expected vehicle deceleration and (B) determining a stopped vehicle target brake torque value that is greater than a minimum torque value by the determined percent difference; and
    while the vehicle is stopped, controlling the brake system to apply the brake torque at the stopped vehicle target brake torque value.

4. The method of claim 3 wherein the predetermined vehicle braking condition comprises a level vehicle incline and a lowest vehicle weight so that the percent difference between the determined actual vehicle deceleration and the determined expected vehicle deceleration represents a deviation of an actual vehicle braking condition from the predetermined vehicle braking condition.

5. A method of braking a vehicle having a brake system for applying a brake torque for braking the vehicle, the method comprising the steps of:
    sensing a brake effort command value $P_{MC}$;
    while the vehicle is moving (A) controlling the brake system for applying the brake torque for braking the vehicle equal to a product $(P_{MC})*(MOVING\ GAIN)$, where MOVING GAIN is a calibration gain value for a moving vehicle, (B) determining an actual vehicle deceleration, and (C) determining an expected vehicle deceleration resulting from the applied brake torque and a predetermined vehicle braking condition;
    sensing a stopped condition of the vehicle;
    when a stopped condition is first sensed (A) determining a percent difference between the determined actual vehicle deceleration and the determined expected vehicle deceleration, (B) determining a stopped vehicle target brake torque value TARGET TORQUE that is greater than a minimum torque value by the determined percent difference, and (C) determining a gain value STATIC GAIN equal to a quotient $(TARGET\ TORQUE)/P_{MC}$; and
    while the vehicle is stopped, controlling the brake system for applying the brake torque equal to a product $(P_{MC})*(STATIC\ GAIN)$.

6. A method of braking a vehicle having a brake system for applying a brake torque for braking the vehicle, the method comprising the steps of:
    sensing a brake effort command value $P_{MC}$;
    while the vehicle is moving (A) controlling the brake system for applying the brake torque for braking the vehicle equal to a product $(P_{MC})*(\text{MOVING GAIN})$, where MOVING GAIN is a calibration gain value for a moving vehicle, (B) determining an actual vehicle deceleration value $\alpha_{aa}$, and (C) determining an expected vehicle deceleration value $\alpha_{ea}$ resulting from the applied brake torque and a predetermined vehicle braking condition;

sensing a stopped condition of the vehicle;

when a stopped condition is first sensed (A) determining a value PERCENT DIFFERENCE equal to an expression $1 + \|\alpha_{aa} - \alpha_{ea}\|$, (B) determining a value TARGET TORQUE equal to a product $(\text{MINIMUM TORQUE})*(\text{PERCENT DIFFERENCE})$, where MINIMUM TORQUE is a predetermined stopped vehicle torque value for the predetermined vehicle braking condition, and (C) determining a gain value STATIC GAIN equal to a quotient $(\text{TARGET TORQUE})/P_{MC}$; and while the vehicle is stopped, controlling the brake system for applying the brake torque equal to a product $(P_{MC})*(\text{STATIC GAIN})$.

* * * * *